Patented July 28, 1925.

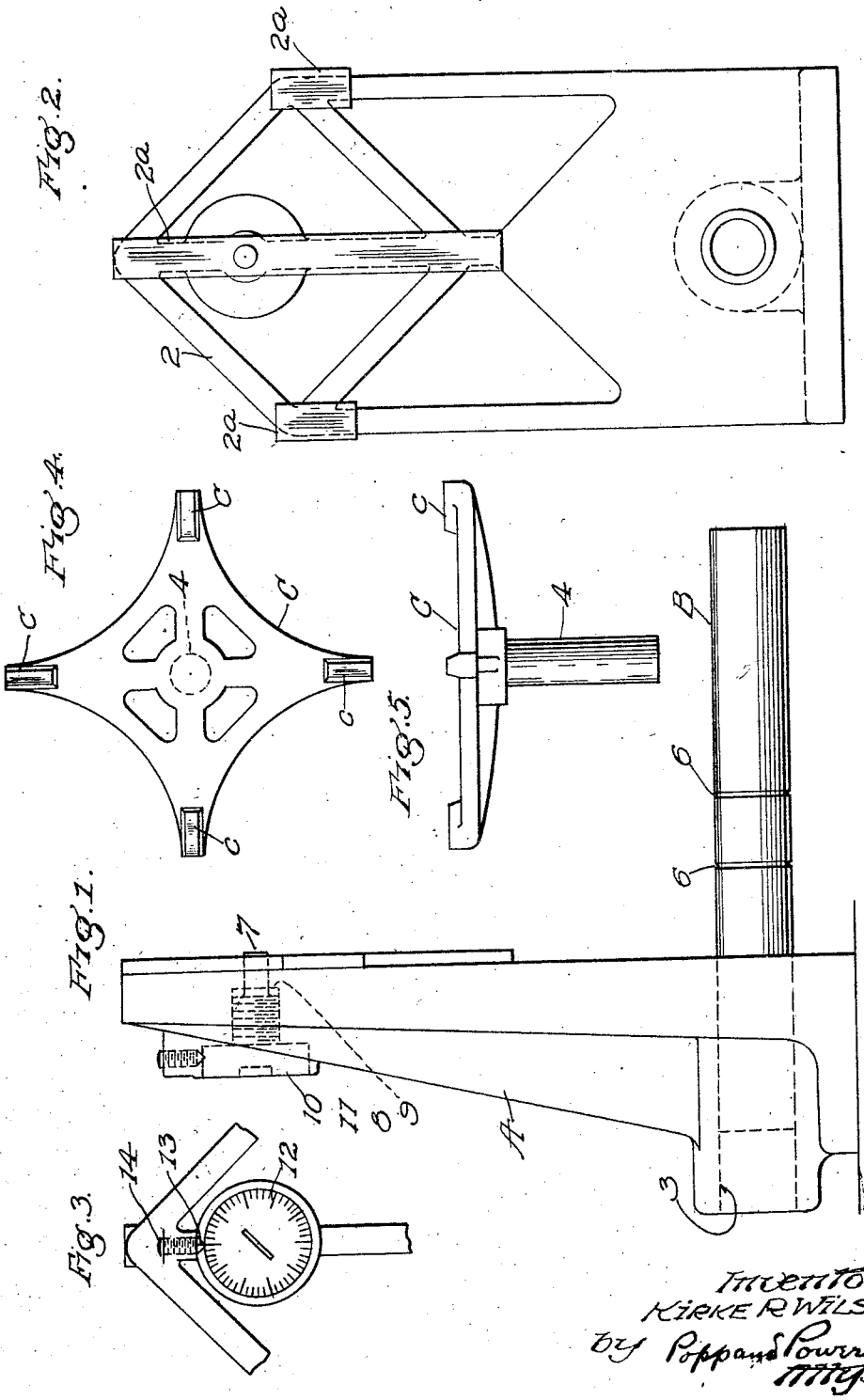

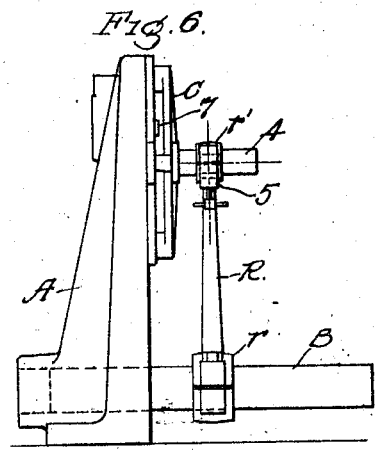
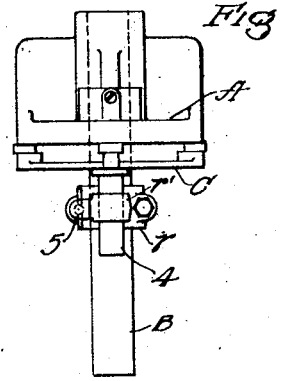
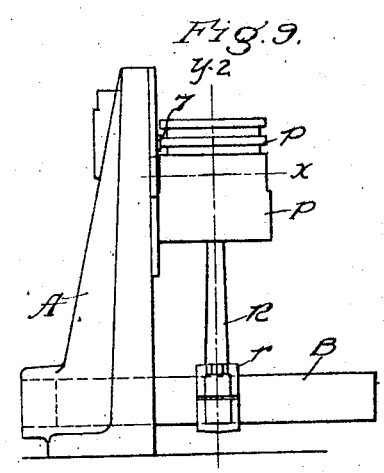
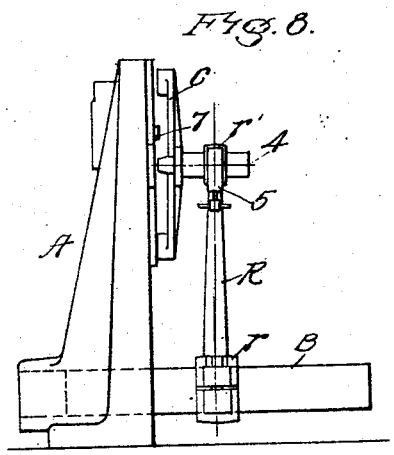
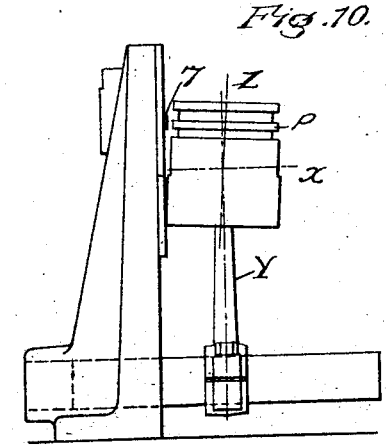

1,547,279

UNITED STATES PATENT OFFICE.

KIRKE R. WILSON, OF BUFFALO, NEW YORK.

JIG FOR THE ALIGNMENT OF PISTONS AND PISTON CONNECTING RODS.

Application filed December 13, 1923. Serial No. 680,341.

*To all whom it may concern:*

Be it known that I, KIRKE R. WILSON, a citizen of the United States, residing at Buffalo, in the county of Erie and State of New York, have invented a new and useful Improvement in Jigs for the Alignment of Pistons and Piston Connecting Rods, of which the following is a specification.

This invention relates to improvements in jigs for the alignment of pistons and piston connecting rods. It is essential to the satisfactory operation of internal combustion engines that the pistons be true in formation and that they travel exactly in the direction of their longitudinal axis. If the surface of the piston be out of true or if its axis be inclined with reference to the direction of piston movement the piston is said to be "cocked" and cocked pistons result in piston slaps or knocks, pumping of oil, and the scoring of the cylinders. Such cocking of the piston may be due to the deformation of the piston, to the inaccuracy of its fit upon the connecting pin, to the distortion of the connecting rod or to a combination of these causes.

In order to insure satisfactory results in the operation of the motor it is therefore necessary that both the piston and its connecting rod be tested, whereby any defects which exist, in the respects noted, may be ascertained and corrected. The necessity for such tests is well known but heretofore so far as I am aware, the means employed has been open to objection in one particular or another, some of the devices being too elaborate and costly in their equipment, some being difficult to use, particularly with a view to absolute accuracy of results, and some failing to insure accuracy.

The object of the present invention is, therefore, to provide an extremely simple and inexpensive jig which will be available for testing both connecting rods and pistons and which by its novel structural features prescribes a facile mode of use by which absolute accuracy of result can be obtained.

With this object in view the invention consists in certain novel details of structure and combination which will be set forth at length as the description proceeds.

An embodiment of the invention is illustrated in the accompanying drawings, wherein:

Figure 1 is a side elevation of the upright member of the jig.

Figure 2 is a front view thereof.

Figure 3 is a fragmentary rear view thereof showing more particularly the means for the adjustment of the piston aligning pin.

Figure 4 is a front elevation of a gage plate or templet used in testing the alignment of the connecting rod.

Figure 5 is a plan view thereof.

Figures 6 and 7 are, respectively, a side elevation and a plan view showing the jig as used for testing the alignment of a connecting rod, the rod showing a true alignment.

Figure 8 is a side elevation showing the jig as used for testing the alignment of a connecting rod, the rod showing a distortion.

Figure 9 is a side elevation showing the jig as used for testing a piston, the piston showing true cylindrical conformation and true alignment.

Figure 10 is a side elevation showing the jig as used for testing the piston, the test jig showing the piston to be out of alignment.

The complete jig consists of three essential parts, namely, an upright support A, an arbor B and a gage plate or templet C, all three of these parts are used for testing the alignment of the connecting rod, whereas the gage plate C is not directly used in testing the form and alignment of the piston. The connecting rod is tested first and if it is found to be out of alignment it is restored to true alignment. The connecting rod whose true alignment has thus been ascertained, is then fitted to the piston and thereafter the piston is tested. Any lack of alignment which the piston may show will thereby not be attributed to any fault in the piston rod but to the deformation of the piston or its inaccurate centering on its pin.

The support A is formed at its lower end with a suitably extended flat base 1 by which said support may have a stable bearing upon a bench or table. At its upper end the support A is formed with a gage plate 2 whose working face lies in a vertical plane. The part of the support which carries the plate 2 may be vertically adjustable relatively to the base 1 or it may be integral with the part which carries the base 1, the integral construction being shown. The only advantage of the vertical adjustment is that it gives the jig a somewhat wider range of use, making it adaptable to connecting rods of various lengths. The plate 2 may have a continuous working face or it may, as shown, be in the form of a series of blocks 2ª, whose faces are co-planar, such blocks constituting the functional equivalent of a continuous plate and being suitably arranged for the purposes in view. At a point above the base 1 the support A is provided with a horizontal bore 3 extending between its front and rear faces and in which is removably fitted the arbor B. The gage plate or templet C may have a continuous working face or, as shown it may be provided with a series of blocks c whose faces are co-planar and which correspond in number and arrangement to the blocks 2ª. The plate C is provided with a centrally located pin 4 which extends at a right angle to the common plane of the faces of the blocks c and is available for securing said plate to the connecting rod to be tested.

The operation of testing the connecting rod is shown in Figures 6, 7 and 8. The connecting rod r is clamped by means of its bearing upon the arbor B at a point suitably located between the ends of said arbor, and the post 4 of the plate C is fitted in the collar $r^1$ at the upper end of the connecting rod. The post 4 engages in the collar $r^1$ in the manner of the wrist pin of the piston and is suitably secured in position, a clamp 5 engaging over the lugs of the collar $r^1$ being shown for this purpose. With the plate C confronting the plate 2 the arbor B is then inserted in the bore 3 of the support A and is moved inward in said bore until the plate C contacts the plate 2. If the rod r be free from distortion all of the blocks c will engage uniformly against the blocks 2ª so that no light will be visible between the engaging faces of any of said blocks. This condition is illustrated in Figures 6 and 7 and the uniform engagement of all of the blocks c with all of the blocks 2ª is an indication that the connecting rod is in perfect alignment. If however the rod r be bent the plate C will be correspondingly canted and one or more of the blocks c, according to the direction of the bend in the rod r, will be spaced from the corresponding blocks 2ª so that light will show between the faces of the non-engaging blocks. This condition is illustrated in Figure 8 and the presence of a bend in the rod is thereby indicated, the extent and direction of the bend being determined by the location of the blocks c which are not in engagement with the corresponding blocks 2ª and by the degree of their separation from such corresponding blocks. When a bend in the rod r is thus detected the rod may be straightened by means of a wrench or a suitable bending tool and the testing and rod straightening operations will be repeated until a perfect alignment of the rod is established by a test meeting the conditions above described and as shown in Figure 6.

When the perfect alignment of the connecting rod has thus been ascertained the test of the piston may be made. The previously tested connecting rod is removed from the arbor B and fitted by means of its collar $r^1$ in working position upon the wrist pin of the piston. The arbor B, according to the invention, is made double length whereby with the connecting rod arranged at the exact center thereof either end of the arbor may be inserted in the bore 3 for the purpose to be later described. To facilitate the location of the connecting rod on the arbor with reference to the piston test the arbor is preferably provided with annular grooves or scorings 6, whose spacing corresponds to the width of the bearing r of the connecting rod and which are located equidistant from a point central of the length of the arbor. The connecting rod carrying the piston P is then fitted upon the arbor and secured by its bearing r in a position in which the sides of said bearing coincide with the grooves or scorings 6. In order to obtain certainty of results, i. e., to insure the accuracy of the test, the piston should be tested at diametrically opposite points. This is facilitated by providing the arbor B of double length so that the portions thereof at either side of the connecting rod will be available for engagement in the bore of the support. Thus when the piston has been tested at one side the arbor may be withdrawn and inserted in reverse position in the bore 3 whereby the piston may be tested at the opposite side.

The portions of the piston above the first upper piston ring groove are of slightly less diameter than the body of the piston below said groove, the variation being different for different engines and being dictated by the fact that the upper portion of the piston is subject to greater heat and consequent expansion than the main body. In order to obtain absolute accuracy of result the test should be made both as to the main body of the piston and as to its portion of reduced diameter and in order that such test may be encompassed in a single operation the plate 2 is provided, according to the invention, with a projection 7 standing out beyond the faces of the blocks 2ª by a distance equal to half of the difference in diameter between the main body and the reduced portion of the piston, the projection 7 being located at an elevation whereby it will engage the shoulder p above the first upper piston ring. The gage piece C is in any case formed on its engaging face with a suitable clearance for the projection 7. In Figures 9 and 10 of the drawings the difference in diameter between the shoulder p and the main body of the piston has necessarily been greatly exaggerated since in actual practice it cannot be apprehended except with a measuring instrument; thus in one of the well known makes of automobile engines the shoulder p is .005 inch less in diameter than the main body of the piston and for use with such a piston the projection will extend .0025 inch beyond the common plane of the working faces of the blocks 2ª. While the projection 7 may be fixed its utility in such case will be limited to pistons having a corresponding variation between the diameters of their main bodies and the shoulder p. It is therefore preferred that the projection 7 be adjustable in order that it may be adapted to the different diametrical variations of the different makes of pistons. For this purpose said projection is preferably formed at one end of a screw stem 8 (Figure 1) which has threaded engagement in a socket 9 open to the rear face of the support A and which carries an operating head 10 mounted in a ring 11 cast with or secured to said support. The head 10 has on its outer face a suitable annular scale 12 and co-operates with a fixed index mark 13 on the adjacent face of the ring 11. It will be obvious that the degree to which the projection 7 extends beyond the working faces of the blocks 2ª can be varied by turning the head 10 and will be indicated by the co-operation of the index mark 13 and the scale 12. When the projection 7 has been set to the position desired it is secured against movement by a lock screw 14 engaging the head 10, the screw 14 being threaded through a lug 15 which is formed as an extension from the ring 11. In the operation of testing the piston the arbor B is inserted into the bore 3 until its further inward movement is prevented by the contact of the piston with the plate 2. A perfectly formed and perfectly aligned piston will, as tested at opposite sides thereof, have its main body portion in uniform contact with the adjacent block 2ª and its reduced portion p in contact with the portion 7. This condition, for one side of the piston, is shown in Figure 9; and after the test of one side of the piston with the positive results shown in Figure 9 the arbor B, without unfastening the connecting rod, is withdrawn and reversed and again inserted into the bore 3 in like manner for a similar test on the opposite side of the piston. If the piston be cocked or be not truly cylindrical it will not uniformly contact the adjacent block 2ª and the projection 7 and light will show between the face of the piston and the faces of either said block or said projection or both. If this condition appears in a test of either side of the piston an indication is thereby given that the piston is defective. Such defectedness may be due to its being inaccurately centered on its pin or to its not being truly cylindrical or to both causes and a workman skilled in operations of this kind will have no difficulty in ascertaining, as a result of the test or tests, the causes of the trouble and correcting the same. Figure 10 illustrates a defect which is not uncommon, that is to say wherein the piston is inaccurately centered on its pin. In this figure the axis of the piston wrist pin is indicated by the line X, the axis of the connecting rod by the line Y and the axis of the piston by the line Z. It will be seen that the axis X and Y are at right angles but that the axis Z which should coincide with the axis Y is tilted at an angle thereto. The inaccurate centering of the piston on its wrist pin may be due to unequal wear of the bushings or to irregularity in their fitting. If the piston be accurately centered on the wrist pin and a further test should show at either side of the piston a lack of engagement or an imperfect engagement between the same and the adjacent block 2ª and projection 7 an indication will thereby be given that the piston is not truly cylindrical. It will be noted that any defects developed by the test shown in Figure 9 may always be attributed to the piston, in either of the respects noted, since the perfect alignment of the connecting rod was previously established by the test shown in Figure 6.

From the foregoing it will be seen that I have provided a jig which is simple and inexpensive in its structural makeup, which can be used with facility for testing both connecting rods and pistons and which provides for testing operations of such character that certainty of result can be obtained and absolute accuracy in the fitting and alignment of the connecting rods and pistons can be effected.

Having fully described my invention, I claim:

1. A jig for testing the alignment of pistons and piston rod connections including an upright support provided at its front side with a vertically presented gage plate and having a horizontal bore extending between its front and rear faces at a point beyond said gage plate, and an arbor which is removably fitted in said bore and upon which a piston connecting rod may be mounted, said arbor being of double length whereby with the piston connecting rod mounted approximately centrally thereof either of the arbor portions at opposite sides of said connecting rod may be inserted in said bore without disconnecting the piston connecting rod from said arbor, thereby to enable opposite sides of the piston to be tested by said gage plate.

2. A jig for testing the alignment of pistons and piston rod connections including an upright support provided at its front side with a vertically presented gage plate and having a horizontal bore extending between its front and rear faces at a point beyond said gage plate, an arbor which is removably fitted in said bore and upon which a piston connecting rod may be mounted, and a projection standing out from the face of the gage plate to engage a portion of the piston of reduced diameter, said arbor being of double length whereby with the piston connecting rod mounted approximately central thereof either of the arbor portions at opposite sides of said connecting rod may be inserted in said bore, thereby to enable opposite sides of the piston to be tested by said gage plate.

3. A jig for testing the alignment of pistons and piston rod connections including an upright support provided at its front side with a vertically presented gage plate and having a horizontal bore extending between its front and rear faces at a point beyond said gage plate, an arbor which is removably fitted in said bore and upon which a piston connecting rod may be mounted, a projection standing out from the face of the gage plate to engage a portion of the piston of reduced diameter, and a gage piece structurally independent of said support for cooperation with the face of said gage plate, said gage piece being formed to provide clearance for said projection and having a projecting post by means of which it may be secured to the end of the connecting rod mounted on said arbor.

4. A jig for testing the alignment of pistons and piston rod connections including an upright support provided at its front side with a vertically presented gage plate and having a horizontal bore extending between its front and rear faces at a point beyond said gage plate, an arbor which is removably fitted in said bore and upon which a piston connecting rod may be mounted, a projection standing out from the face of the gage plate to engage a portion of the piston of reduced diameter, said arbor being of double length whereby with the piston connecting rod mounted approximately central thereof either of the arbor portions at opposite sides of said connecting rod may be inserted in said bore, thereby to enable opposite sides of the piston to be tested by said gage plate, and a gage piece structurally independent of said support for co-operation with the face of said gage plate, said gage piece being formed to provide clearance for said projection and having a projecting post by means of which it may be secured to the end of the connecting rod mounted on said arbor.

In testimony whereof I affix my signature.

KIRKE R. WILSON.